(12) United States Patent
Jan

(10) Patent No.: US 11,833,602 B1
(45) Date of Patent: Dec. 5, 2023

(54) EDGE BAND FINE TRIMMING MECHANISM OF EDGE BANDING MACHINE

(71) Applicant: OAV EQUIPMENT AND TOOLS, INC., Taichung (TW)

(72) Inventor: Long-Chang Jan, Taichung (TW)

(73) Assignee: OAV EQUIPMENT AND TOOLS, INC., Taichung (TW)

( * ) Notice: Subject to any disclaimer, the term of this patent is extended or adjusted under 35 U.S.C. 154(b) by 0 days.

(21) Appl. No.: 17/881,394

(22) Filed: Aug. 4, 2022

(51) Int. Cl.
| | |
|---|---|
| *B23D 53/00* | (2006.01) |
| *B26D 1/15* | (2006.01) |
| *B26D 1/52* | (2006.01) |
| *B65B 5/02* | (2006.01) |
| *B27B 13/00* | (2006.01) |
| *B65B 43/26* | (2006.01) |
| *B23D 55/06* | (2006.01) |

(52) U.S. Cl.
CPC .................................. *B23D 55/06* (2013.01)

(58) Field of Classification Search
CPC ........ B26D 1/147; B26D 7/0675; B26D 1/52; B26B 69/0033; B23D 55/046; B23D 53/005; B23D 55/082; B23D 61/126; B42C 11/04; Y10T 83/6633; Y10T 83/2192; Y10T 83/2083; Y10T 83/741; Y10T 83/8884; Y10T 83/8889; Y10T 83/937264
USPC .... 83/794, 107, 155.435, 2.933, 155.1, 446, 83/54, 449, 444, 946, 368, 404, 422, 83/425.2, 428.661; 30/2; 53/50, 381.2, 53/492; 414/412
See application file for complete search history.

(56) References Cited

U.S. PATENT DOCUMENTS

| | | | | |
|---|---|---|---|---|
| 2,729,885 | A | * | 1/1956 | Wahl .................. B65B 69/0033 414/412 |
| 3,424,357 | A | * | 1/1969 | Huffman ............... C03B 33/027 83/402 |
| 3,888,150 | A | * | 6/1975 | Stroud ..................... B26D 1/52 83/425.2 |
| 5,101,703 | A | * | 4/1992 | Tanaka ............... B65B 69/0033 83/368 |
| 6,591,722 | B1 | * | 7/2003 | Sauer .................... B26D 1/147 198/689.1 |

FOREIGN PATENT DOCUMENTS

| | | |
|---|---|---|
| TW | M367645 U1 | 11/2009 |
| TW | I671237 B | 9/2019 |

* cited by examiner

*Primary Examiner* — Ghassem Alie
(74) *Attorney, Agent, or Firm* — Muncy, Geissler, Olds & Lowe

(57) ABSTRACT

An edge band fine trimming mechanism of an edge banding machine includes a fixed seat, and a lateral feeler wheel, a top feeler wheel set and a scraper, which are disposed on the fixed seat. The lateral feeler wheel is rotatably disposed on the fixed seat. The top feeler wheel set includes a fixing member adjustably disposed on the fixed seat, and first and second top feeler wheels disposed separately, both rotatably disposed on the fixing member and located at a same predetermined height. The scraper is located between the lateral feeler wheel and the top feeler wheel set for trimming an edge of an edge band of a workpiece. Even though the workpiece has a hole, the scraper is positionally maintainable by the top feeler wheel set, that effectively reduces appearance defects of the end edge of the edge band caused in the edge trimming process.

4 Claims, 7 Drawing Sheets

US 11,833,602 B1

EDGE BAND FINE TRIMMING MECHANISM OF EDGE BANDING MACHINE

BACKGROUND OF THE INVENTION

1. Field of the Invention

The present invention relates to an edge band fine trimming mechanism of an edge banding machine and specifically speaking, to an edge band fine trimming mechanism which is applicable to a workpiece provided on the surface thereof with a hole.

2. Description of the Related Art

As to the traditional edge banding machine, refer to Taiwan Patent No. 1671237, the application of which was made by the applicant of the present invention. Refer to FIG. 1, wherein an edge banding machine is illustrated, which includes a base 10, a set of slideway 20, a positioning pressing wheel set 30 and a plurality of other mechanisms including a pre-milling mechanism 40, a glue applying mechanism 50, an edge band conveying mechanism 60, a horizontal pressing wheel set 70 and a bottom trimming mechanism 80. The slideway 20 is movably disposed on the base 10. The positioning pressing wheel set 30 is disposed above the slideway 20. A workpiece to be processed is clipped between the slideway 20 and the positioning pressing wheel set 30, and can be moved. The pre-milling mechanism 40 performs a preliminary processing to the surface of the workpiece. The glue applying mechanism 50 applies glue to the surface of the workpiece. The edge band conveying mechanism 60 is adapted to convey an edge band to the workpiece applied with the glue. Then, the edge banding machine cuts off the edge band by a cutter (not shown) and tightly presses the cut-off edge band to the workpiece by the horizontal pressing wheel set 70, so as to combine the cut-off edge band with the workpiece applied with the glue tightly. At last, the edge banding machine trims edges of the edge band by an edge band fine trimming mechanism which usually includes a top trimming mechanism (not shown) and the bottom trimming mechanism 80, so as to trim off the superfluous part of the cut-off edge band and chamfer the edges of the edge band.

In the edge trimming process by using the edge band fine trimming mechanism, it needs a feeler wheel to keep a scraper of the edge band fine trimming mechanism located at a fixed height relative to the workpiece, preventing the edge trimming process from causing an end edge of the edge band an appearance defect. However, for partial workpieces with special structures, such as door planks of cupboards (e.g. the door plank 71 of a cupboard shown in FIG. 3 of Taiwan Patent No. M367645), the workpiece usually needs to be provided by cutting on the top surface thereof with a hole for the installation of a hinge. When the workpiece having the aforementioned hole passes by the feeler wheel of the edge band fine trimming mechanism, the feeler wheel may fall into the aforementioned hole, resulting in improper vertical displacement of the scraper, thereby causing the edge band an appearance defect.

SUMMARY OF THE INVENTION

It is one of the objectives of the present invention to make an improvement against the defects of the presently available edge band fine trimming mechanism of the edge banding machine, so as to bring up a brand-new configuration design of an edge band fine trimming mechanism of an edge banding machine, which can reduce the appearance defects of the end edge of the edge band caused in the edge trimming process.

Therefore, an edge band fine trimming mechanism of an edge banding machine provided according to the present invention is applied to a workpiece with an edge band adhered thereto. The aforementioned edge band fine trimming mechanism includes a fixed seat, a lateral feeler wheel, a top feeler wheel set, and a scraper. The aforementioned lateral feeler wheel is horizontally and rotatably disposed on the aforementioned fixed seat. The top feeler wheel set includes a fixing member, and a first top feeler wheel and a second top feeler wheel, which are disposed separately. The fixing member is adjustably disposed on the fixed seat. The first top feeler wheel and the second top feeler wheel are both vertically and rotatably disposed on the fixing member. The first and second top feeler wheels are located at a same predetermined height. The aforementioned scraper is disposed on the fixed seat and located between the lateral feeler wheel and the top feeler wheel set for trimming an end edge of the aforementioned edge band.

As a result, during using the edge band fine trimming mechanism to perform the edge trimming process to the workpiece which has a hole in configuration design, in the moving process of the workpiece, even though one of the feeler wheels of the top feeler wheel set is located at the position of the hole, the edge band fine trimming mechanism can still maintain the position of the scraper relative to the edge band by the other feeler wheel of the top feeler wheel set, thereby effectively reducing appearance defects of the end edge of the edge band caused in the edge trimming process.

In one of the aspects, the aforementioned edge band fine trimming mechanism may be a top trimming mechanism or a bottom trimming mechanism for trimming a top end edge or a bottom end edge of the edge band respectively.

In another aspect, the fixing member of the top feeler wheel set is rotatably disposed on the fixed seat for the convenience of synchronous adjustment of the position of height of the first and second top feeler wheels.

Specifically, the fixed seat also includes an installation portion. The installation portion has two adjustment threaded holes provided separately. The aforementioned two adjustment threaded holes are located at front and rear ends of the installation portion respectively. Two adjustment screws are disposed in the aforementioned two adjustment threaded holes, and terminal ends of the aforementioned two adjustment screws are abutted against the fixing member. Through the aforementioned two adjustment screws, the inclined angle of the fixing member is adjustable, thereby convenient for the adjustment of the position of height of the first and second top feeler wheels.

Specifically, the fixing member also includes a vertical plate and a horizontal plate. The horizontal plate is connected to the top end of the vertical plate. The terminal ends of the aforementioned two adjustment screws are both abutted against the horizontal plate. The first and second top feeler wheels are both vertically and rotatably disposed on the aforementioned vertical plate.

In another aspect, the fixed seat also includes a scraper installation groove. The scraper structurally includes a blade holder and a blade. The blade holder includes a vertical section and an inclined section. The vertical section is disposed in the aforementioned scraper installation groove capably of moving vertically. The inclined section is connected to the bottom end of the vertical section and extends toward a boundary between the lateral feeler wheel and the top feeler wheel set. The blade is disposed at the terminal end of the inclined section. Through the scraper installation groove, the position of the scraper relative to the end edge of the edge band is adjustable effectively.

Specifically, the fixed seat is also provided with a fastening threaded hole. The aforementioned vertical section is provided with an elongated hole. A fastening screw passes through the aforementioned elongated hole and screwed into the fastening threaded hole for preferably adjusting and fixing the position of the scraper.

BRIEF DESCRIPTION OF THE DRAWINGS

The detailed structure, features, assembling or using manner related to the edge band fine trimming mechanism of the edge banding machine will be described in the following embodiment. However, it should be understood that the embodiment to be described in the following and the figures are given by way of illustration only, not limitative of the claimed scope of the present invention, and wherein:

DETAILED DESCRIPTION OF THE INVENTION

The technical content and features of the present invention will be described in detail by the following embodiment in coordination with the figures. The directional terms mentioned in the content of the specification, such as 'upper', 'lower', 'inside', 'outside', 'top', and 'bottom', are just for illustrative description on the basis of normal usage direction, not intended to limit the claimed scope.

For the detailed description of the technical features of the present invention, the following embodiment is instanced and illustrated in coordination with the figures. Wherein, for the convenience of illustrating the following embodiment, the direction of this embodiment will be based on that the workpiece W is located on the left side of the edge band fine trimming mechanism 1.

Figure 1:
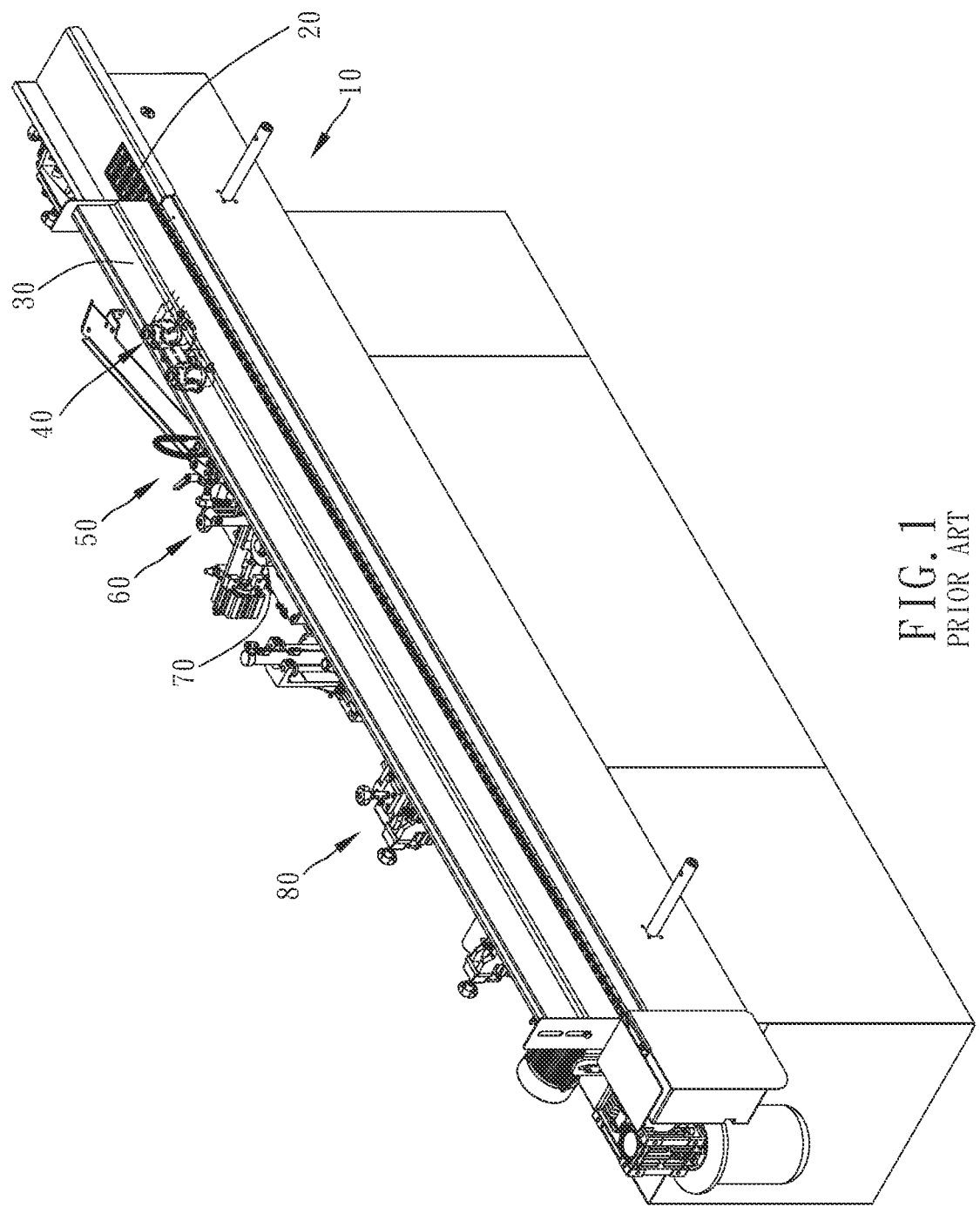
FIG. 1 is a perspective view of a conventional edge banding machine.
Figure 2:
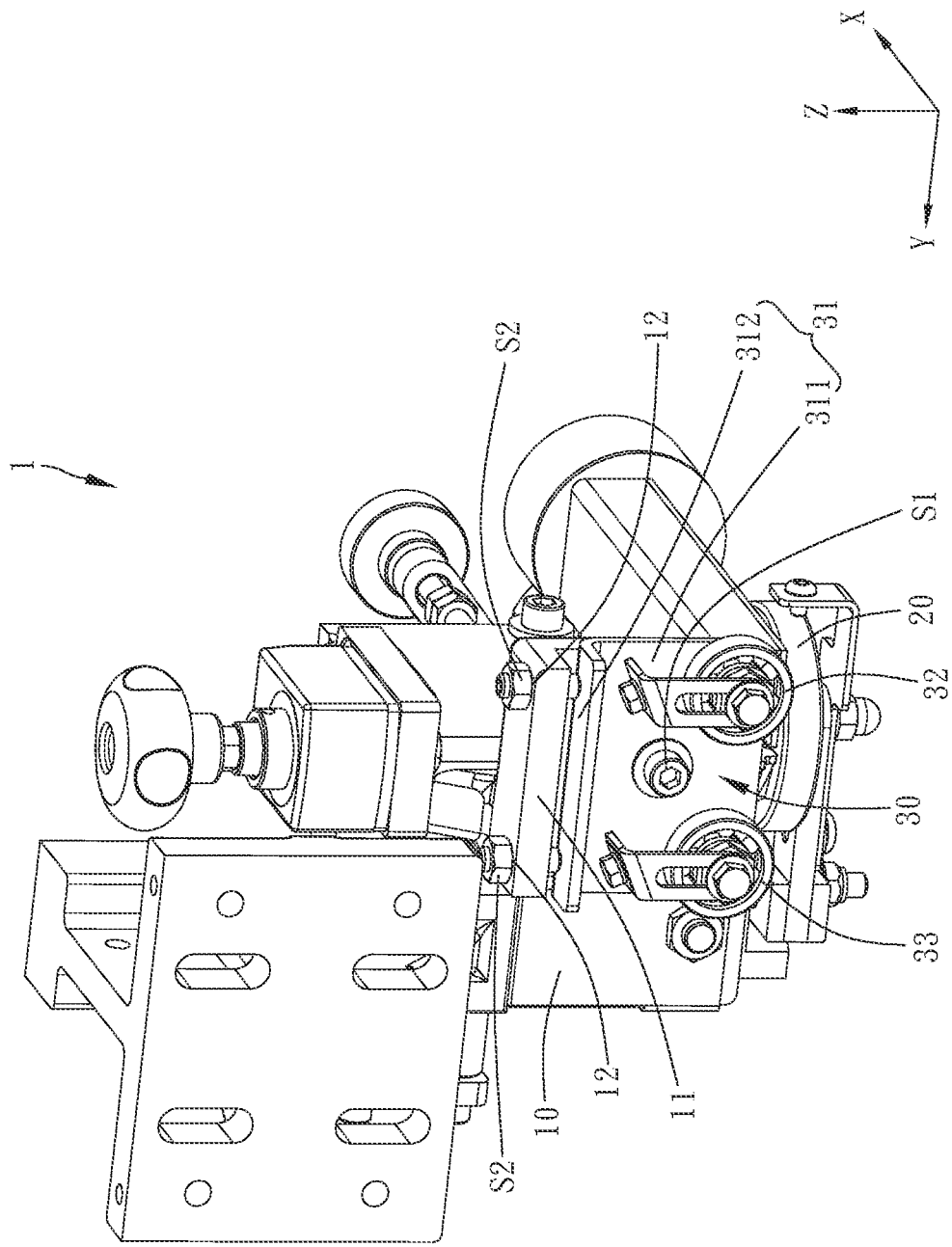
FIG. 2 is a perspective view of an edge band fine trimming mechanism of an edge banding machine of an embodiment.
Figure 3:
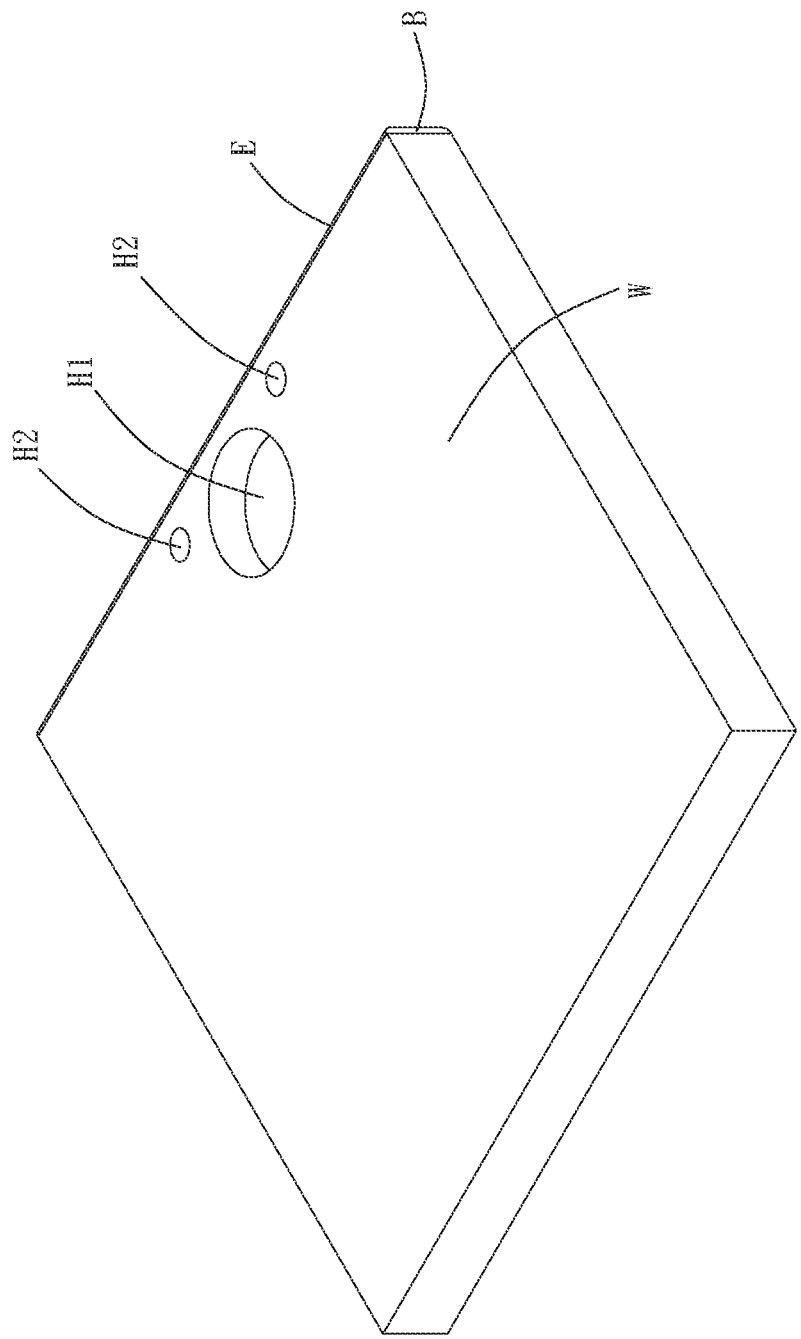
FIG. 3 is a perspective view of a workpiece with an edge band adhered thereto.
Figure 7:
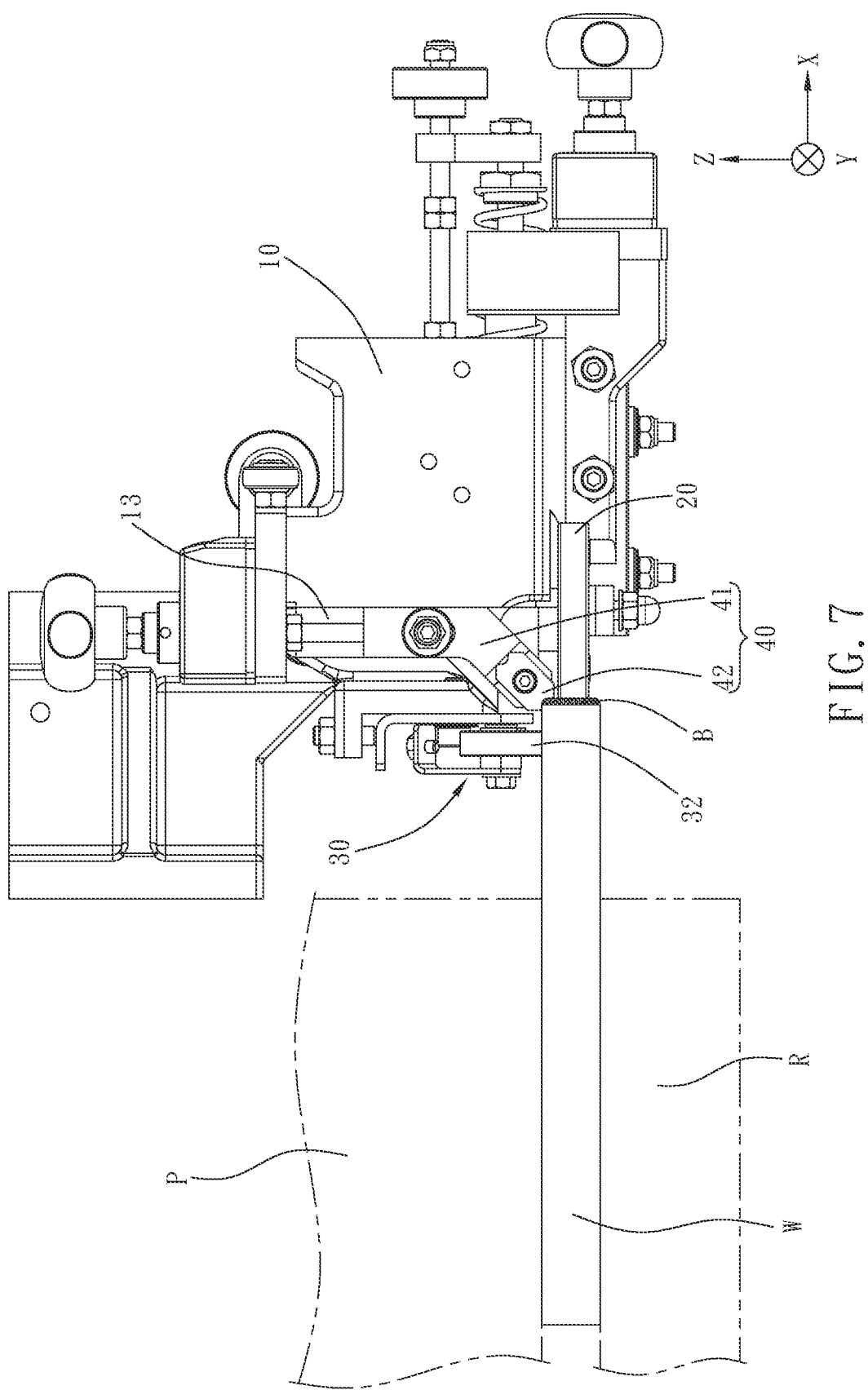
FIG. 7 is a lateral view of FIG. 6.

As shown in FIG. 2, an edge band fine trimming mechanism 1 of an edge banding machine provided in the embodiment is applied to a workpiece W with an edge band B adhered thereto (shown in FIG. 3), for removing the superfluous part of the edge band B and chamfering top, bottom, front and rear end edges of the edge band B. As shown in FIG. 7, the workpiece W is disposed on a set of slideway R, a set of positioning pressing wheel set P is abutted on the top surface of the workpiece W, and the workpiece W is moved by the set of slideway R and the set of positioning pressing wheel set P. In this embodiment, the workpiece W is provided on the top surface thereof with a large-sized hole H1 and two small-sized holes H2 (as shown in FIG. 3).

Referring to FIG. 2 to FIG. 7, the aforementioned edge band fine trimming mechanism 1 includes a fixed seat 10, a lateral feeler wheel 20, a top feeler wheel set 30, and a scraper 40.

The fixed seat 10 is adapted for disposing the lateral feeler wheel 20, top feeler wheel set 30 and scraper 40, and the fixed seat 10 is fixed on a base of the edge banding machine. The fixed seat 10 is provided on the left side thereof with an installation portion 11. The installation portion 11 has two adjustment threaded holes 12 disposed separately. Two adjustment screws S2 are disposed in the aforementioned two adjustment threaded holes 12 respectively. Besides, as shown in FIG. 5 and FIG. 7, the fixed seat 10 is provided on the front side thereof with a scraper installation groove 13.

Figure 4:
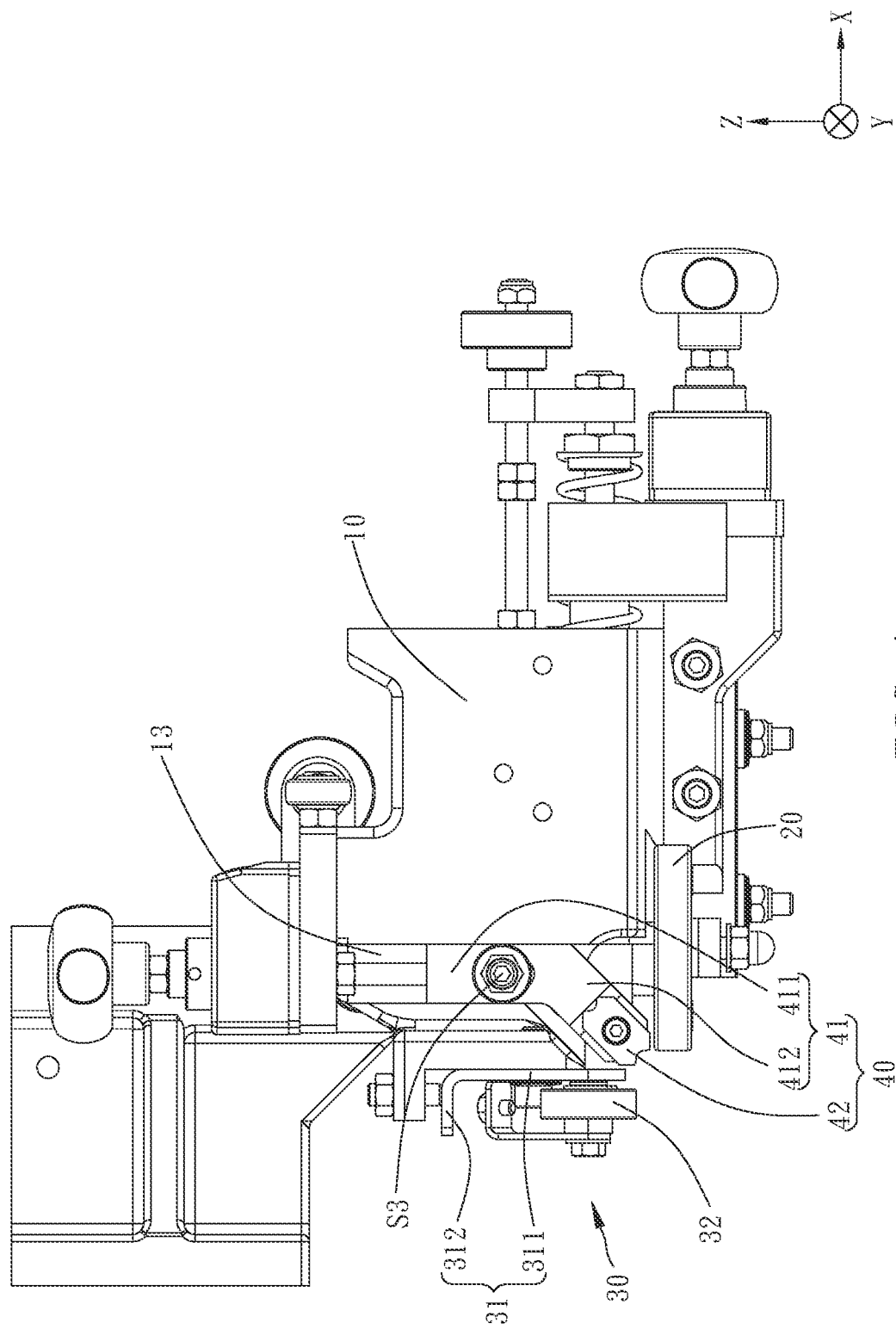
FIG. 4 is a lateral view of FIG. 2.

The lateral feeler wheel 20 is disposed on the bottom of the fixed seat 10 in a horizontal and rotatable manner. As shown in FIG. 4, the lateral feeler wheel 20 is rotatably disposed on the bottom of the fixed seat 10 in a way with an imaginary axis parallel to Z-axis. The lateral feeler wheel 20 is in contact with the surface of the edge band B for determining the position of a lateral reference surface of the workpiece W with the edge band B adhered thereto.

Referring to FIG. 2 and FIG. 4., the top feeler wheel set 30 includes a fixing member 31, and a first top feeler wheel 32 and a second top feeler wheel 33, which are disposed separately. The fixing member 31 is rotatably disposed on the left side surface of the fixed seat 10 through a screw S1. The fixing member 31 structurally includes a vertical plate 311 and a horizontal plate 312. The horizontal plate 312 is integrally connected to the top end of the vertical plate 311. The terminal ends of the aforementioned two adjustment screws S2 are both abutted against the horizontal plate 312 of the fixing member 31 for adjusting the rotational angle of the fixing member 31. The first top feeler wheel 32 and second top feeler wheel 33 are both vertically and rotatably disposed on the vertical plate 311 of the fixing member 31. The sentence 'vertically and rotatably disposed on the vertical plate 311' mentioned in this embodiment refers to that the first and second top feeler wheels 32 and 33 are both rotatably disposed on the vertical plate 311 in a way with an imaginary axis parallel to X-axis. The first and second top feeler wheels 32 and 33 are disposed at the front and rear sides of the fixing member 31 respectively. The first and second top feeler wheels 32 and 33 are adjusted to be located at a same predetermined height. The predetermined height usually refers to the distance between the first top feeler wheel 32 and the bottom surface of the workpiece W. The first and second top feeler wheels 32 and 33 are both in contact with the surface of the workpiece W for determining the position of a top reference surface of the workpiece W with the edge band B adhered thereto. In this embodiment, the first and second top feeler wheels 32 and 33 and the lateral feeler wheel 20 are all bearings.

Figure 5:
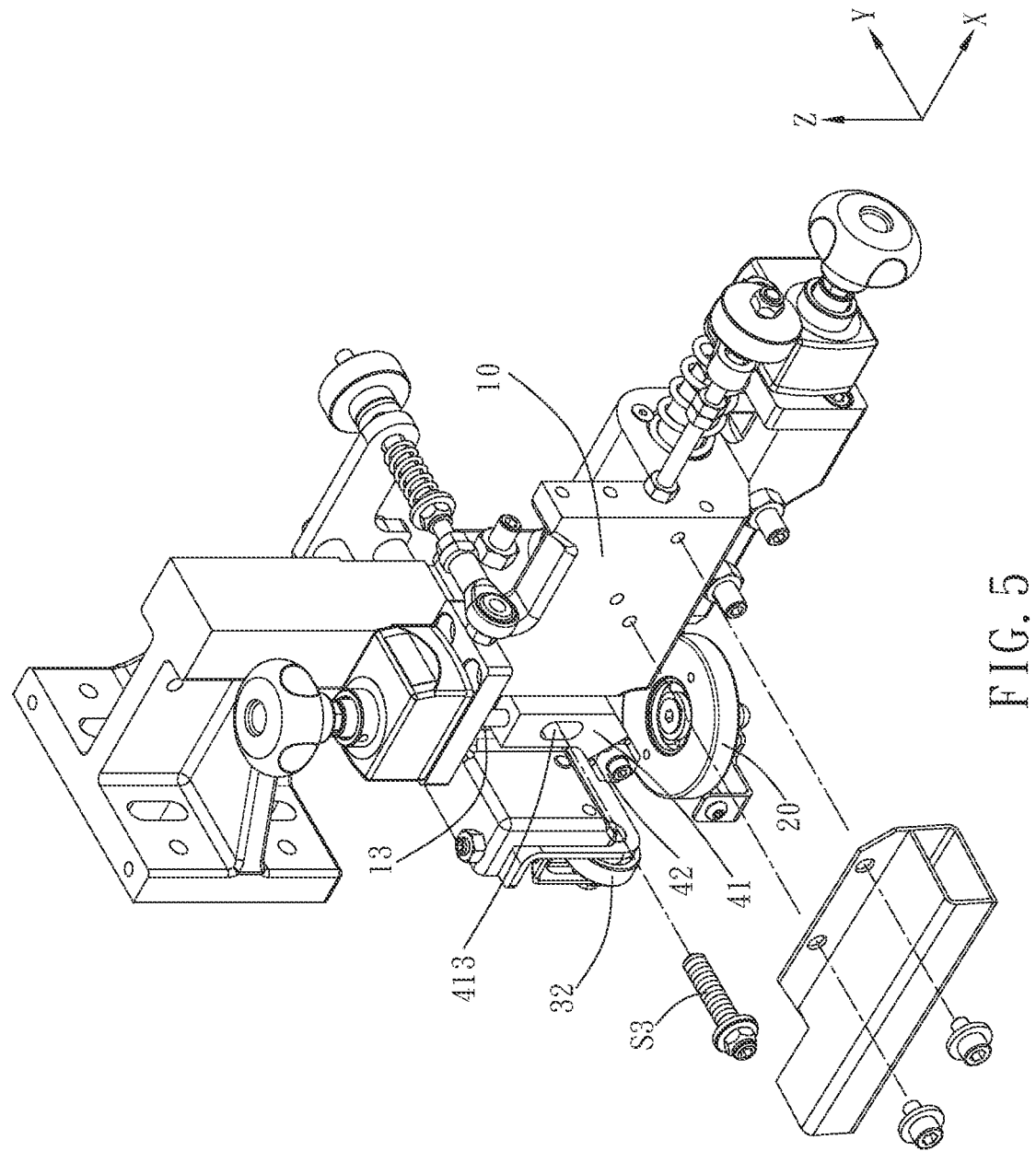
FIG. 5 is an exploded view of the edge band fine trimming mechanism of the embodiment.

Referring to FIG. 3 to FIG. 5 and FIG. 7, the scraper 40 is disposed in the scraper installation groove 13 of the fixed seat 10 capably of moving vertically. The scraper 40 is located between the lateral feeler wheel 20 and the top feeler wheel set 30, and adapted to trim an end edge of the edge band B (in this embodiment it trims a top end edge E of the edge band B). The scraper 40 structurally includes a blade holder 41 and a blade 42. The blade holder 41 includes a vertical section 411 and an inclined section 412. The vertical section 411 is disposed in the scraper installation groove 13 capably of moving vertically. The inclined section 412 is connected to the bottom end of the vertical section 411 and extends toward a boundary between the lateral feeler wheel 20 and the top feeler wheel set 30. The blade 42 is disposed at the terminal end of the inclined section 412. In order to effectively fix the scraper 40 when the scraper 40 is adjusted to correspond in position to the top end edge E of the edge band B, the blade holder 41 is also provided with an elongated hole 413 (as shown in FIG. 5) on the vertical section 411, and the fixed seat 10 is provided with a fastening threaded hole (in FIG. 5 it is hided in the elongated hole 413). A fastening screw S3 passes through the elongated hole 413 and is screwed into the aforementioned fastening threaded hole, enabling the blade holder 41 to be fixed in the scraper installation groove 13 of the fixed seat 10.

Figure 6:
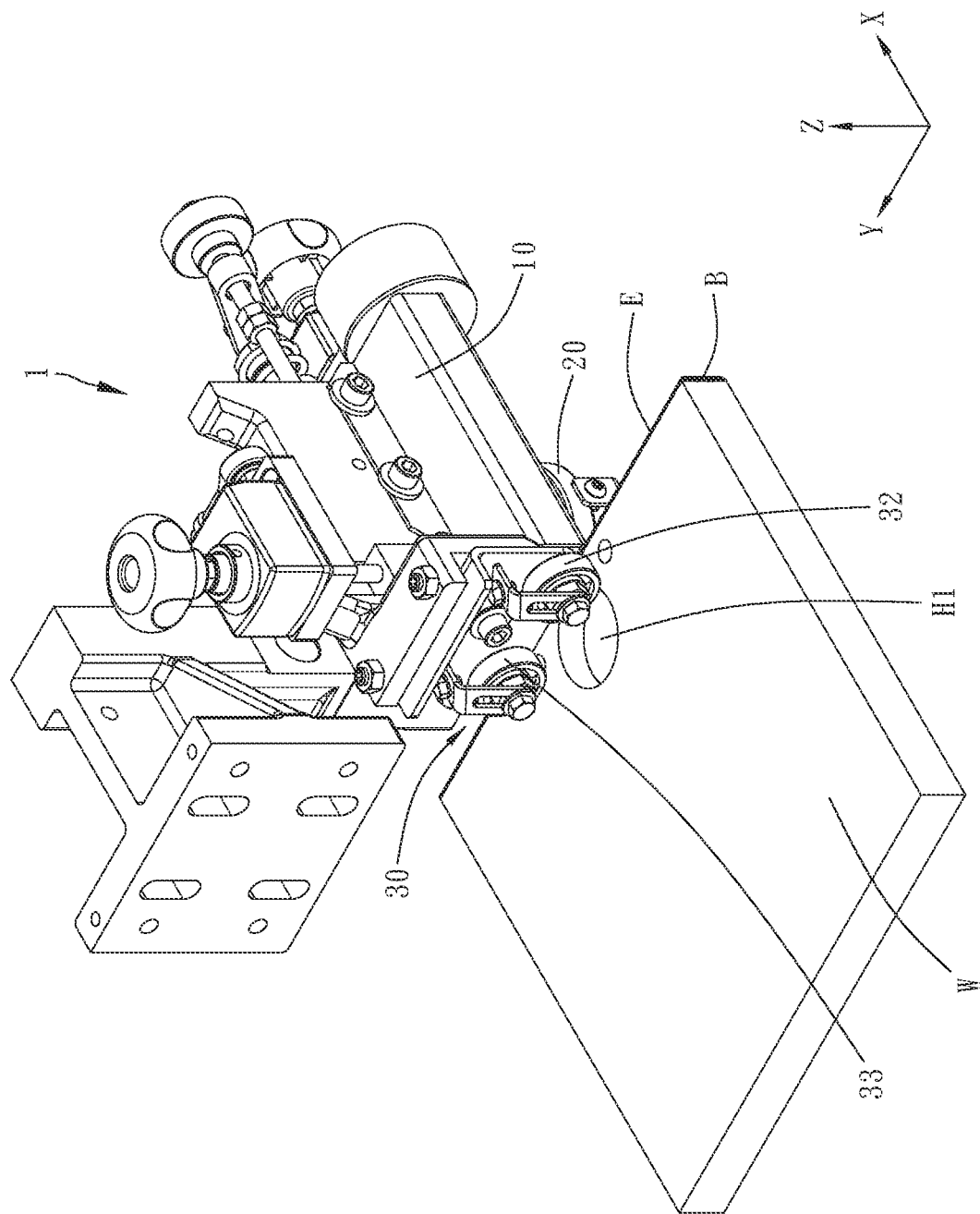
FIG. 6 is a schematic view showing the usage of the edge band fine trimming mechanism of the embodiment.

Referring to FIG. 6 and FIG. 7, through the configuration design of the edge band fine trimming mechanism 1 of this embodiment, in the process of using the edge band fine trimming mechanism 1 to trim the top end edge E of the edge band B, even though the hole H1 of the workpiece W passes by below the first top feeler wheel 32 of the top feeler wheel set 30, the second top feeler wheel 33 abutting thereagainst can still maintain the position of the scraper 40 relative to the top end edge E of the edge band B, which prevents the top end edge E of the edge band B from the appearance defect caused by a little upward and downward vibration of the scraper 40 relative to the edge band B. On the other hand, if the hole H1 of the workpiece W passes by below the second top feeler wheel 33 of the top feeler wheel set 30, the first top feeler wheel 32 abutting thereagainst can still maintain the position of the blade 42 relative to the top end edge E of the edge band B.

At last, it should be mentioned again that the method and constituent elements disclosed in the above embodiment of the present invention are only taken as examples for illustration, not intended to limit the scope of the present invention. The simple structural retouch or variations, or substitution of other equivalent elements, which are not to be regarded as a departure from the spirit of the invention, should be included within the scope of the following claims of the present invention.

What is claimed is:

1. An edge band fine trimming mechanism of an edge banding machine, which is applied to a workpiece with an edge band adhered thereto, the edge band fine trimming mechanism comprising:
   a fixed seat;
   a lateral feeler wheel horizontally and rotatably disposed on the fixed seat;
   a top feeler wheel set comprising a fixing member, and a first top feeler wheel and a second top feeler wheel, which are disposed separately, the fixing member being adjustably disposed on the fixed seat, the first top feeler wheel and the second top feeler wheel being both vertically and rotatably disposed on the fixing member, the first top feeler wheel and the second top feeler wheel being located at a same predetermined height;
   a scraper disposed on the fixed seat and located between the lateral feeler wheel and the top feeler wheel set for trimming an end edge of the edge band;
   wherein the fixing member is rotatably disposed on the fixed seat;
   wherein the fixed seat comprises an installation portion; the installation portion has two adjustment threaded holes provided separately; the two adjustment threaded holes are located at front and rear ends of the installation portion respectively; two adjustment screws are disposed in the two adjustment threaded holes; terminal ends of the two adjustment screws are abutted against the fixing member.

2. The edge band fine trimming mechanism as claimed in claim 1, wherein the fixing member comprises a vertical plate and a horizontal plate; the horizontal plate is connected to a top end of the vertical plate; the terminal ends of the two adjustment screws are abutted against the horizontal plate; the first top feeler wheel and the second top feeler wheel are both vertically and rotatably disposed on the vertical plate.

3. An edge band fine trimming mechanism of an edge banding machine, which is applied to a workpiece with an edge band adhered thereto, the edge band fine trimming mechanism comprising:
   a fixed seat;
   a lateral feeler wheel horizontally and rotatably disposed on the fixed seat;
   a top feeler wheel set comprising a fixing member, and a first top feeler wheel and a second top feeler wheel, which are disposed separately, the fixing member being adjustably disposed on the fixed seat, the first top feeler wheel and the second top feeler wheel being both vertically and rotatably disposed on the fixing member, the first top feeler wheel and the second top feeler wheel being located at a same predetermined height;
   a scraper disposed on the fixed seat and located between the lateral feeler wheel and the top feeler wheel set for trimming an end edge of the edge band;
   wherein the fixed seat comprises a scraper installation groove; the scraper comprises a blade holder and a blade; the blade holder comprises a vertical section and an inclined section; the vertical section is disposed in the scraper installation groove capably of moving vertically; the inclined section is connected to a bottom end of the vertical section and extends toward a boundary between the lateral feeler wheel and the top feeler wheel set; the blade is disposed at a terminal end of the inclined section.

4. The edge band fine trimming mechanism as claimed in claim 3, wherein the fixed seat is provided with a fastening threaded hole; the vertical section is provided with an elongated hole; a fastening screw passes through the elongated hole and screwed into the fastening threaded hole.

* * * * *